United States Patent
Murofushi

(10) Patent No.: US 11,498,043 B2
(45) Date of Patent: Nov. 15, 2022

(54) METHODS FOR PRODUCING WET GEL AND XEROGEL

(71) Applicant: AGC Inc., Chiyoda-ku (JP)

(72) Inventor: Hidenobu Murofushi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 450 days.

(21) Appl. No.: 16/738,189

(22) Filed: Jan. 9, 2020

(65) Prior Publication Data

US 2020/0139328 A1 May 7, 2020

Related U.S. Application Data

(63) Continuation of application No. PCT/JP2018/031242, filed on Aug. 23, 2018.

(30) Foreign Application Priority Data

Sep. 1, 2017 (JP) .............................. JP2017-168932

(51) Int. Cl.
*B01J 13/00* (2006.01)
*C08G 77/04* (2006.01)

(52) U.S. Cl.
CPC .......... *B01J 13/0091* (2013.01); *C08G 77/04* (2013.01)

(58) Field of Classification Search
CPC .......... C08L 83/04; C08L 83/08; C08L 33/08; C08L 61/06; C08L 61/28; C08L 1/00; C08F 112/08
See application file for complete search history.

(56) References Cited

U.S. PATENT DOCUMENTS

2013/0153508 A1* 6/2013 Makeiff ............ B01D 17/0202
210/708

FOREIGN PATENT DOCUMENTS

| CN | 102839893 A | 12/2012 |
| EP | 0 018 955 A1 | 11/1980 |
| JP | 10-324579 A | 12/1998 |
| WO | WO 2007-010949 A1 | 1/2007 |

OTHER PUBLICATIONS

International Search Report dated Nov. 6, 2018 in PCT/JP2018/031242 filed Aug. 23, 2018, 2 pages.

\* cited by examiner

*Primary Examiner* — Kuo Liang Peng
(74) *Attorney, Agent, or Firm* — Oblon, McClelland, Maier & Neustadt, L.L.P.

(57) ABSTRACT

To provide methods for producing a wet gel and a xerogel, in which variation in gel thickness is little even without highly controlling the levelness of the mold and the gels are less likely to break at the time of gelation or demolding. The method for producing a wet gel comprises, in such a state that a second liquid layer 14 made of a second liquid containing a gel raw material, is present on a first liquid layer 12 made of a first liquid, letting the second liquid layer 14 be gelled. The method for producing a xerogel comprises drying the wet gel thereby produced or a solvent-substituted gel obtainable by subjecting said wet gel to solvent substitution.

14 Claims, 4 Drawing Sheets

METHODS FOR PRODUCING WET GEL AND XEROGEL

TECHNICAL FIELD

The present invention relates to methods for producing a wet gel and a xerogel.

BACKGROUND ART

A transparent heat insulating material is expected as a heat insulating material in window glass for an automobile or window glass for a building for the purpose of improving the cooling and heating efficiency in a compartment of the automobile or building.

As a transparent heat insulating material, an alkylsiloxane aerogel having a three-dimensional network structure has been proposed, which is formed of through holes continuous in a three-dimensional network form and a skeleton made of an alkylsiloxane continuous in a three-dimensional network form (Patent Document 1).

The alkylsiloxane aerogel is produced by a method in which an acidic aqueous solution containing a silicon compound such as methyltrimethoxysilane and a surfactant, is stirred to form a sol; the sol is poured into a mold and gelled in the mold to obtain a wet gel; this wet gel is subjected to solvent substitution to obtain a solvent substituted gel; and the obtained solvent substituted gel is dried.

PRIOR ART DOCUMENT

Patent Document

Patent Document 1: WO2007/010949

DISCLOSURE OF INVENTION

Technical Problem

However, the method described in Patent Document 1 has the following problems.
  As shown in FIG. 9, if the mold 10 is tilted even slightly, an inclination is caused in thickness of the wet gel 20, thus causing variation in thickness of the wet gel 20. Therefore, it is necessary to highly control the levelness of the mold.
  The wet gel is in contact with the bottom surface and side surfaces of the mold, whereby the wet gel is made to be less likely to be movable by the mold. Therefore, due to the difference in the thermal expansion coefficient between the wet gel and the mold, the contraction of the wet gel at the time of gelation, etc., a distortion is likely to occur in the wet gel, whereby the wet gel tends to break.
  The wet gel is in contact with the bottom surface and side surfaces of the mold, whereby when the wet gel is taken out from the mold, an excessive force is likely to be exerted to the wet gel, whereby the wet gel tends to break.

The present invention is to provide a method for producing a wet gel, whereby variation in thickness of the wet gel is little even without highly controlling the levelness of the mold, and the gel is less likely to break at the time of gelation and demolding; a method for producing a xerogel from the obtainable wet gel; and a method for producing laminated glass by using the xerogel.

Solution to Problem

The present invention has the following embodiments.
<1> A method for producing a wet gel, which comprises, in such a state that a second liquid layer made of a second liquid containing a gel raw material, is present on a first liquid layer made of a first liquid, letting the second liquid layer be gelled.
<2> The method for producing a wet gel according to <1>, wherein the second liquid layer is let be gelled while maintaining the separation state between the first liquid layer and the second liquid layer.
<3> The method for producing a wet gel according to <1> or <2>, wherein the amount of the second liquid which is dissolved in 100 g of the first liquid is at most 100 g.
<4> The method for producing a wet gel according to any one of <1> to <3>, wherein the specific gravity of the first liquid is larger than the specific gravity of the second liquid.
<5> The method for producing a wet gel according to any one of <1> to <4>, wherein as the first liquid and the second liquid, ones which do not react with each other are used.
<6> The method for producing a wet gel according to any one of <1> to <5>, wherein the first liquid does not substantially contain a gel raw material.
<7> The method for producing a wet gel according to any one of <1> to <6>, wherein the standard deviation in thickness of the wet gel obtained by letting the second liquid layer be gelled, is at most 0.5 mm.
<8> The method for producing a wet gel according to any one of <1> to <7>, wherein the first liquid is a liquid compound having a fluorine atom, a liquid compound having a chlorine atom, a liquid compound having a silicon atom, water, or mercury.
<9> The method for producing a wet gel according to any one of <1> to <7>, wherein the first liquid is a fluorinated solvent, a fluorinated oil, a chlorinated solvent, a chlorinated oil or a silicone-type oil.
<10> The method for producing a wet gel according to any one of <1> to <9>, wherein a solvent contained in the second liquid is an organic solvent or water.
<11> A method for producing a xerogel, which comprises drying the wet gel obtainable by the production method as defined in any one of <1> to <10>, or a solvent substituted gel obtainable by subjecting said wet gel to solvent substitution, to obtain a xerogel.
<12> The method for producing a xerogel according to <11>, wherein the xerogel is a polysiloxane, a polymethyl (meth)acrylate, a polystyrene, an addition condensate of resorcinol or melamine with formaldehyde, or cellulose.
<13> The method for producing a xerogel according to <11> or <12>, wherein the transmittance at a wavelength 500 nm of the xerogel is at least 70% as calculated in a thickness of 1 mm.
<14> The method for producing a xerogel according to any one of <11> to <13>, wherein the refractive index of light having a wavelength of 594 nm at 25° C., of the xerogel, is from 1.0 to 1.1.
<15> A method for producing a laminated glass, which comprises producing a xerogel by the production method as defined in any one of <11> to <13>, and then, sandwiching the obtained xerogel by glass plates.

Advantageous Effects of Invention

According to the production methods of the present invention, it is possible to provide a wet gel wherein variation in thickness of the gel is little even without highly controlling the levelness of the mold, and the gel is less likely to break at the time of gelation and demolding; to provide a xerogel having good characteristics with little variation in thickness, from the wet gel; and to produce a laminated glass having excellent characteristics from the xerogel.

DESCRIPTION OF EMBODIMENTS

The following definitions of terms apply throughout the specification including claims.

A "wet gel" is meant for a gel of which a three-dimensional network has been swollen by a swelling agent. It includes a hydrogel where the swelling agent is water, an alcogel where the swelling agent is an alcohol, and an organogel where the swelling agent is an organic solvent.

A "xerogel" means a "gel consisting of an open mesh formed by removing the swelling agent from a gel" according to the "definitions of terminology relating to the structures and processes of sol, gel, mesh and inorganic-organic composite material (IUPAC recommendations 2007)" by the "International Union of Pure and Applied Chemistry (IUPAC), Inorganic Chemistry Group and Polymer Group polymer terminology subcommittee". There is a classification method, in which one obtained by removing the swelling agent by the supercritical drying, is classified to be an aerogel, one obtained by removing the swelling agent by conventional evaporative drying, is classified to be a xerogel, and one obtained by removing the swelling agent by freeze-drying, is classified to be a cryogel, but, in the present specification including claims, these will be collectively referred to as xerogels.

The expression "to" showing a numerical range is meant to include the numerical values given before and after the expression as the lower limit value and the upper limit value.

The dimensional ratios in FIGS. 1 to 9 are, for convenience of explanation, different from the actual ones.

<Method for Producing Gel>

The method for producing a gel of the present invention, is a method which comprises, in such a state that a second liquid layer made of a second liquid containing a gel raw material, is present on a first liquid layer made of a first liquid, letting the second liquid layer be gelled.

In the method for producing a gel of the present invention, the second liquid layer is let be gelled to obtain a wet gel, and the wet gel may be subjected to solvent substitution to obtain a solvent substituted gel. Further, the wet gel or solvent substituted gel may be dried to obtain a xerogel.

(Production of Wet Gel)

Figure 1:
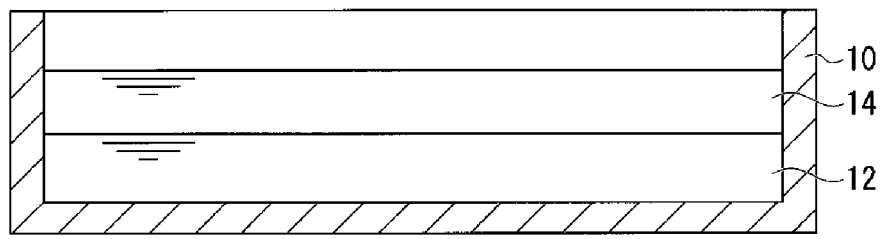
FIG. 1 is an illustrative diagram showing, in a schematic cross-sectional view of a mold, a state of producing a wet gel in the mold by the method for producing a gel in one embodiment of the present invention.

FIG. 1 is an illustrative diagram showing, in a schematic cross-sectional view of a mold, a state where a wet gel is formed in a mold in one embodiment of the method for producing a gel of the present invention.

In a mold 10 consisting of a bottom plate and side plates extending upward from the peripheral edge of the bottom plate, in such a state that a second liquid layer 14 made of a second liquid containing a gel raw material, is present on a first liquid layer 12 made of a first liquid, the second liquid layer 14 is let be gelled.

As the method for letting the second liquid layer 14 be present on the first liquid layer 12, for example, the following methods may be mentioned.

A method of pouring the first liquid into the mold 10, and pouring the second liquid on the first liquid, to let the second liquid layer 14 be present on the first liquid layer 12.

A method of pouring the first liquid and the second liquid simultaneously into the mold 10, followed by being left to stand still to let the first liquid and the second liquid be phase-separated so as to let the second liquid layer 14 be present on the first liquid layer 12.

A method of pouring a mixed liquid having components constituting the first liquid and components constituting the second liquid mixed, into the mold 10, followed by being left to stand still to let the components constituting the first liquid and the components constituting the second liquid be phase-separated so as to let the second liquid layer 14 be present on the first liquid layer 12.

In order to let the second liquid layer 14 be present on the first liquid layer 12, it is preferred that the compatibility of the first liquid and the second liquid is low. The compatibility of the first liquid and the second liquid can be estimated by the amount of the second liquid to be dissolved in 100 g of the first liquid. The amount of the second liquid to be dissolved in 100 g of the first liquid is preferably at most 100 g, more preferably at most 10 g, further preferably at most 1 g. When the amount of the second liquid to be dissolved in 100 g of the first liquid is at most the upper limit value in the above range, while the separation state between the first liquid layer and the second liquid layer is kept for a long time, the second liquid layer 14 can be present on the first liquid layer 12. The smaller the amount of the second liquid to be dissolved in 100 g of the first liquid, the better, and the preferred lower limit is 0 g.

In order to let the second liquid layer 14 be present on the first liquid layer 12, it is preferred that the specific gravity of the first liquid is larger than the specific gravity of the second liquid. Specifically, the specific gravity of the former is preferably larger by at least 0.1, more preferably larger by at least 0.5, than the specific gravity of the latter. When the specific gravity of the first liquid is larger than the specific gravity of the second liquid, it is easy to let second liquid layer 14 be present on the first liquid layer 12. Further, there is no need to worry about the charging order at the time of charging the first liquid and the second liquid to the mold 10, or disturbance of the interface between the first liquid layer 12 and the second liquid layer 14. On the other hand, if the specific gravity of the first liquid is excessively larger than the specific gravity of the second liquid, the kind of combination of such liquids is limited, and also the weight of the entire production apparatus is obliged to be heavy, and therefore, the specific gravity of the former is preferably not larger by at least 3.0, more preferably not larger by at least 2.0, than the latter.

In order to let the second liquid layer 14 be present on the first liquid layer 12, as the first liquid and the second liquid, it is preferred to use those which do not react with each other.

The first liquid may be suitably selected depending on the solvent in the second liquid. The first liquid may be a liquid compound having a fluorine atom, a liquid compound having a chlorine atom, a liquid compound having a silicon atom, water, mercury, etc. Water may contain a water-soluble salt in order to adjust the specific gravity of the first liquid. The water-soluble salt may be sodium chloride, etc.

The liquid compound having a fluorine atom may be a fluorinated solvent, a fluorinated oil, etc.

The fluorinated solvent may be a hydrofluoroalkane, a chlorofluorocarbon, a hydrochlorofluorocarbon, a hydrofluoro monoether, a perfluoro monoether, a perfluoroalkane, a perfluoropolyether, a perfluoro amine, a fluorine atom-containing alkene, a fluorine atom-containing aromatic compound, a fluorine atom-containing ketone, a fluorine-atom containing ester, etc. Commercially available products of the fluorinated solvent, may be ASAHIKLIN AK-225 ($CF_3CF_2CHCl_2$), AC-2000 ($CF_3CF_2CF_2CF_2CHF_2$), AC-6000 ($CF_3CF_2CF_2CF_2CF_2CF_2CH_2CH_3$), AE-3000 ($CF_3CH_2OCF_2CHF_2$), registered trademarks of Asahi Glass Co., Ltd.; Fluorinert and Novec 7100 ($C_4F_9OCH_3$), 7200 ($C_4F_9OC_2H_5$), 7300 ($C_2F_5CF(OCH_3)CF(CF_3)_2$), trade names of 3M Company; Vertrel XF ($CF_3CHFCHFC_2F_5$), MCA, XH, trade names of Du Pont-Mitsui Fluorochemicals Co., Ltd.; ZEORORA H (heptafluorocyclopentane), trade name of Zeon Corporation, etc.

Commercially available products of the fluorinated oil, may be Fomblin, trade name of Solvay; DEMNUM and DAIFLOIL, trade names of Daikin Industries, Ltd., etc.

The liquid compound having a chlorine atom may be a chlorinated solvent, a chlorinated oil, etc.

The chlorinated solvent may be carbon tetrachloride, chloroform, methylene chloride, etc.

The liquid compound having a silicon atom, may be a silicone oil.

The silicone oil may be dimethyl silicone oil, methyl phenyl silicone oil, etc. Commercially available products of the silicone oil may be KF-96, trade name of Shin-Etsu Chemical Co., Ltd., etc.

From the viewpoint of suppressing gelation of the first liquid layer 12, it is preferred that the first liquid does not substantially contain a gel raw material. Does not substantially contain a gel raw material, means not containing a gel raw material other than a gel raw material which has been transferred from the second liquid layer.

The second liquid contains a solvent and a gel raw material.

The solvent in the second liquid may be suitably selected depending on the first liquid. The solvent in the second liquid may be water, an organic solvent, etc.

The organic solvent may be an alcohol (methanol, ethanol, isopropyl alcohol, tert-butyl alcohol, benzyl alcohol, etc.), an aprotic polar organic solvent (N,N-dimethylformamide, dimethyl sulfoxide, N,N-dimethylacetamide, etc.), a ketone (cyclopentanone, acetone, etc.), a hydrocarbon (n-hexane, heptane, etc.), etc.

The gel raw material is suitably selected depending on the type of the finally obtainable xerogel.

In a case where the xerogel is polysiloxane xerogel, the gel raw material may be one containing a silane compound and a catalyst to uniformly promote gelation. The gel raw material may further contain a surfactant (hexadecyltrimethylammonium bromide; hexadecyltrimethylammonium chloride; Pluronic, trade name of BASF; EH-208, trade name of NOF; etc.).

The silane compound may be an alkoxysilane, a 6-membered ring containing silane compound having a 6-membered ring containing skeleton and a hydrolyzable silyl group, a silyl group-containing polymer having an organic polymer skeleton and a hydrolyzable silyl group, etc.

The alkoxysilane may be a tetraalkoxysilane (tetramethoxysilane, tetraethoxysilane, etc.), a monoalkyl trialkoxysilane (methyltrimethoxysilane, methyltriethoxysilane, etc.), a dialkyl dialkoxysilane (dimethyldimethoxysilane, dimethyldiethoxysilane etc.), trimethoxyphenylsilane, a compound having an alkoxysilyl group at both ends of an alkylene group (1,6-bis(trimethoxysilyl) hexane, 1,2-bis (trimethoxysilyl) ethane, etc.), an alkoxysilane having a perfluoropolyether group (perfluoropolyether triethoxysilane, etc.), an alkoxysilane having a perfluoroalkyl group (perfluoroethyl triethoxysilane), pentafluorophenyl ethoxydimethylsilane, trimethoxy(3,3,3-trifluoropropyl) silane, an alkoxysilane having a vinyl group (vinyl trimethoxysilane, vinyl triethoxysilane, dimethoxymethyl vinyl silane), an alkoxysilane having an epoxy group (2-(3, 4-epoxycyclohexyl)ethyl trimethoxysilane, 3-glycidoxypropyl trimethoxysilane, 3-glycidoxypropylmethyl diethoxysilane, 3-glycidoxypropyl triethoxysilane, etc.), an alkoxysilane having an acryloyloxy group (3-acryloyloxypropyl trimethoxysilane), an alkoxysilane having a methacryloyloxy group (3-methacryloxypropyl trimethoxysilane, 3-methacryloxypropylmethyl dimethoxysilane), etc.

The 6-membered ring containing skeleton in the 6-membered ring containing silane compound, is an organic skeleton having at least one type of 6-membered ring selected from the group consisting of an isocyanuric ring, a triazine ring and a benzene ring.

The organic polymer skeleton in the silyl group-containing polymer is an organic skeleton having at least one type of chain selected from the group consisting of a polyether chain, a polyester chain and a polycarbonate chain.

The above catalyst may be a basic catalyst or acid catalyst. As the basic catalyst, an amine (tetramethylammonium hydroxide, etc.), urea, ammonia, sodium hydroxide, potassium hydroxide, etc. may be mentioned. As the acid catalyst, an inorganic acid (nitric acid, sulfuric acid, hydrochloric acid, etc.), or an organic acid (formic acid, oxalic acid, acetic acid, monochloroacetic acid, dichloroacetic acid, trichloroacetic acid, etc.) may be mentioned.

In a case where the xerogel is a polymer xerogel, the gel raw material may be a thermoplastic resin, a curable resin, etc.

The thermoplastic resin may be one which, when heated, will be dissolved in a solvent, and, when cooled, can form monolith (porous body), and, specifically, polymethyl methacrylate, polystyrene, etc. may be mentioned.

The curable resin may be a photocurable resin or a thermosetting resin. The photocurable resin may be one containing either one or both of an acrylate and a methacrylate, and a photoinitiator. The thermosetting resin may be an addition condensate of resorcinol and formaldehyde, an addition condensate of melamine and formaldehyde, etc.

In a case where the xerogel is a cellulose xerogel, the gel raw material may be a combination of cellulose nanofibers and an acid.

The cellulose nanofibers may be 2,2,6,6-tetramethylpiperidine-1-oxyl (TEMPO) oxidized cellulose nanofibers, etc.

The acid may be the above-mentioned inorganic acid or the above-mentioned organic acid.

The method for letting the second liquid layer be gelled, is suitably selected depending on the type of the gel raw material.

In a case where the gel raw material is one containing a silane compound and a catalyst, by heating the second liquid layer present on the first liquid layer to hydrolyze the silane compound to form silanol groups (Si—OH) and reacting them intermolecularly to form Si—O—Si bonds, the second liquid layer is let be gelled.

In a case where the gel raw material is a thermoplastic resin, by pouring the second liquid in a heated state where the thermoplastic resin is dissolved in a solvent, onto the first liquid layer, to cool the second liquid layer present on the first liquid layer, the second liquid layer is let be gelled.

In a case where the gel raw material is a photocurable resin, by radiating light such as ultraviolet light to the second liquid layer present on the first liquid layer to cure the photocurable monomer, the second liquid layer is let be gelled.

In a case where the gel raw material is a thermosetting resin, by heating the second liquid layer present on the first liquid layer to cure the thermosetting monomer, the second liquid layer is let be gelled.

In a case where the gel material is a combination of cellulose nanofibers and an acid, the second liquid layer is let be gelled by adding the acid to the second liquid layer made of a cellulose nanofiber aqueous dispersion present on the first liquid layer.

At the time of letting the second liquid layer be gelled, the first liquid layer and the second liquid layer may partially be mixed to the extent that the second liquid layer is present on the first liquid layer.

At the time of letting the second liquid layer be gelled, from the viewpoint of suppressing the disturbance of the interface between the first liquid layer and the second liquid layer and thus suppressing the variation in the thickness of the wet gel, it is preferred to let the second liquid layer be gelled while maintaining the separated state between the first liquid layer and the second liquid layer. If the disturbance of the interface between the first liquid layer and the second liquid layer can be suppressed, finally, it is possible to obtain a highly transparent xerogel with a smooth surface. In order to let the second liquid layer be gelled while maintaining the separated state between the first liquid layer and the second liquid layer, the solvent may be selected so as to lower the compatibility between the first liquid and the second liquid, or the second liquid layer may be let be gelled in a short time.

Figure 2:
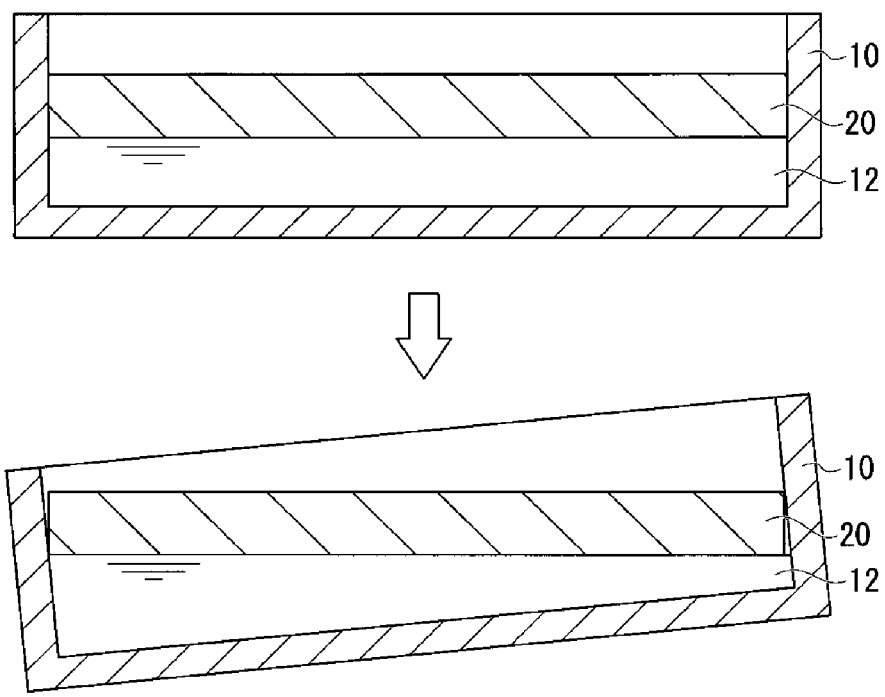
FIG. 2 is an illustrative diagram showing, in a schematic cross-sectional view of a mold, a state of taking out the wet gel formed by the method for producing a gel in one embodiment of the present invention from the mold.

FIG. 2 is an illustrative diagram showing, in a schematic cross-sectional view, a state of taking out the wet gel from the mold.

When the mold 10 is tilted in a state where the wet gel 20 in which the second liquid layer is gelled, is present on the first liquid layer 12, the force of the liquid surface of the first liquid layer 12 to become horizontal, tends to work to let the wet gel 20 also become horizontal, whereby the side surface of the wet gel 20 is peeled off from the side surface of the mold 10 so as to shift up and down relative to the mold 10.

Furthermore, when the mold 10 is tilted, the area of the liquid surface of the first liquid layer 12 becomes larger than that in the horizontal state, whereby the side surface of the wet gel 20 of which the area of the bottom surface does not change, is peeled off to depart from the side surface of the mold 10.

Thus, the wet gel 20 detached from the side surface of the mold 10 can easily be taken out from the mold 10 without applying an excessive force.

The shape of the wet gel obtained by letting the second liquid layer be gelled, may be a film shape, a sheet shape, a plate shape, etc.

The standard deviation in thickness of the wet gel is preferably at most 0.5 mm, more preferably at most 0.3 mm, further preferably at most 0.1 mm.

The above standard deviation is obtained as follows.

Figure 3:
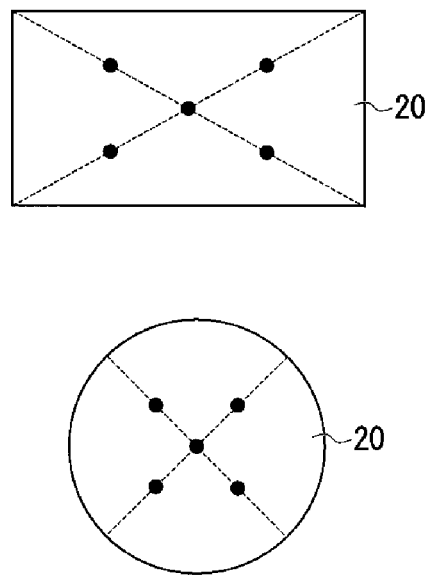
FIG. 3 is a top view of a wet gel showing the positions for measurement of the thickness at 5 points in order to obtain the standard deviation in thickness of the wet gel.

In two lines that pass through the center of the surface of the wet gel and divide the surface of the wet gel into four equal parts, points (a total of 5 points) that divide the respective lines into four equal parts, are determined. For example, in a case where the surface of the wet gel is square, as shown in FIG. 3, in the two diagonal lines, points (a total of 5 points) that divide the respective diagonal lines into four equal parts, are determined. Further, in a case where the surface of the wet gel is circular, in two orthogonal diameter lines, as shown in FIG. 3, points (a total of 5 points) that divide the respective diameter lines into four equal parts, are determined. The thickness of the wet gel at each point is measured, and from the following formula I, the standard deviation is obtained.

$$s = \sqrt{\frac{1}{n}\sum_{n=1}^{n}(x_i - x_{ave})^2} \qquad \text{Formula I}$$

Here, s is the standard deviation, n is the number of measurement points (5 points), $x_i$ is the thickness at each point, $x_{ave}$ is the average of the thicknesses at 5 points.

(Production of Solvent Substituted Gel)

The wet gel may, as the case requires, be solvent-substituted to be a solvent substituted gel.

The solvent substitution is carried out by immersing the wet gel in a solvent.

The solvent to be used for the solvent substitution is suitably selected depending on the method for drying the solvent substituted gel.

As the solvent to be used for the solvent substitution, in the case of supercritical drying, methanol, ethanol, isopropyl alcohol or the like is preferred, in the case of normal pressure drying, a hydrocarbon (hexane, heptane etc.), a fluorinated solvent or the like is preferred, and in the case of freeze drying, tert-butyl alcohol, a fluorinated solvent or the like is preferred.

(Production of Xerogel) As the method for drying a wet gel or solvent substituted gel, a normal pressure drying method, a freeze drying method (freeze-drying method), a subcritical drying method, a supercritical drying method or the like is known.

In an evaporative drying method, for example, under conditions of a temperature of from 20 to 100° C. and normal pressure, the solvent is evaporated from the wet gel or solvent substituted gel.

In the freeze drying method, for example, after freezing the wet gel or solvent substituted gel under a condition of a temperature of from −30 to 0° C., vacuum drying is conducted under a condition of a temperature of from −30 to 100° C.

In the supercritical drying method, for example, under conditions of a temperature of from 35 to 100° C. and a pressure of from 7.4 to 30 MPa, the supercritical carbon dioxide is let be in contact with the wet gel or solvent substituted gel.

Applications of a xerogel may be a transparent heat insulating material, a heat insulating material having a very low thermal conductivity, an air filter, a sound-absorbing material, a hygroscopic material, an oil absorbing material, a separation membrane, etc.

In a case where a xerogel is used as a transparent heat insulating material, the transmittance at a wavelength of 500 nm of the xerogel is preferably at least 70%, more preferably at least 80%, further preferably at least 90%, as calculated in a thickness of 1 mm.

The transmittance is measured in accordance with JIS R3106: 1998 "Test methods for transmittance, reflectance, emissivity and solar radiation heat acquisition rate of plate glass" (corresponding to International Standard ISO 9050: 1990).

Further, with respect to the refractive index of a xerogel, for light having a wavelength of 594 nm at 25° C., the value by a measuring device (manufactured by US Metricon Corp., Prism Coupler: 2010/M) is preferably from 1.0 to 1.1, more preferably from 1.01 to 1.05.

Figure 4:
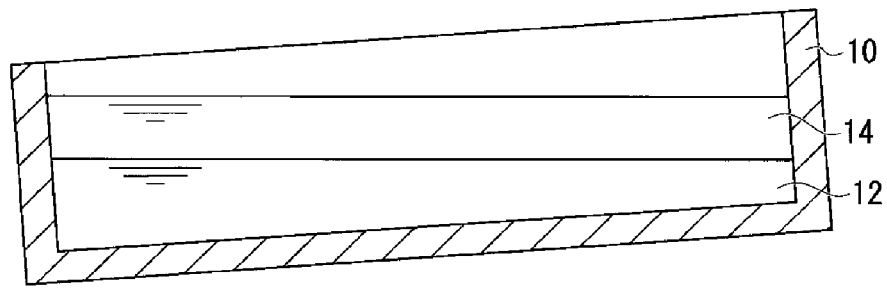
FIG. 4 is an illustrative diagram showing, in a schematic cross-sectional view of a mold, a state where the mold is inclined in the method for producing a gel in one embodiment of the present invention.

In the above-described method for producing a gel of the present invention, since it is a method of letting the second liquid layer be gelled in such a state that the second liquid layer of a second liquid containing a gel raw material is present on the first liquid layer made of a first liquid, even if the mold 10 is inclined as shown in FIG. 4, the horizontal state of the interface between the first liquid layer 12 and the second liquid layer 14, and the horizontal state of the surface of the second liquid layer 14, are maintained, respectively, whereby the thicknesses of the second liquid layer 14 and the wet gel having the second liquid layer 14 gelled, are always substantially uniform. Therefore, variation in the thickness of the wet gel is small even without highly controlling the levelness of the mold 10. This effect becomes more important as the gel size becomes larger.

Further, in the method for producing a gel of the present invention, since it is a method of letting the second liquid layer be gelled in such a state that the second liquid layer of a second liquid containing a gel raw material is present on the first liquid layer made of a first liquid, the second liquid layer is in contact with only the side surface of the mold, and is not in contact with the bottom surface of the mold. Therefore, at the time of letting the second liquid layer be gelled, distortion is less likely to occur in the wet gel, whereby scattering at the gel surface will be reduced, and transparency will be high. Further, special processing is not required so as to smooth the roughness of the inner surface of the container. Further, as shown in FIG. 2, when the mold 10 is tilted in such a state that the wet gel 20 is present on the first liquid layer 12, the side surface of the wet gel 20 will be naturally peeled off from the side surface of the mold 10. And, since the bottom surface of the wet gel 20 is in contact with the surface of the first liquid layer 12, it will not be constrained by the bottom surface of the mold 10. Therefore, at the time of taking out the wet gel 20 from the mold 10, an excessive force is less likely to be applied to the wet gel 20, and the wet gel 20 is less likely to break.

Further, in the method for producing a gel of the present invention, since cracking or breakage is less likely to occur in the wet gel, it is easy to produce a gel with a large area. Further, in the method for producing a gel of the present invention, since the bottom surface of the second liquid layer is not constrained by the mold, a continuous production of a wet gel is also possible.

Another Embodiment

Figure 5:
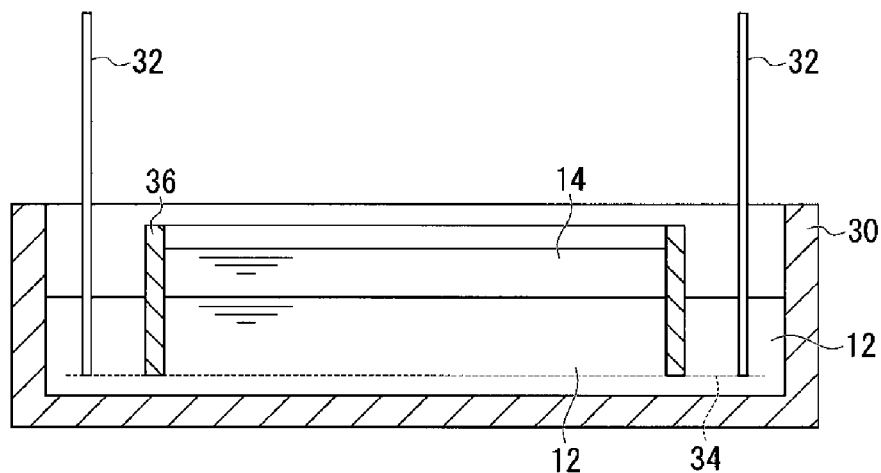
FIG. 5 is a schematic illustrative diagram showing another embodiment of the method for producing a gel of the present invention.

FIG. 5 is a schematic illustrative diagram showing another embodiment of the method for producing a gel of the present invention.

By pouring a first liquid into a container 30 consisting of a bottom plate and side plates extending upward from the periphery of the bottom plate, a first liquid layer 12 is formed. In the first liquid layer 12, a net 34 having withdrawing rods 32 attached, is submerged. A cylindrical inner frame 36 is placed on the net 34, so that the opening is in an up-and-down direction, and the upper portion will project from the liquid surface of the first liquid layer 12. By pouring the second liquid on the first liquid layer 12 in the inner frame 36, the second liquid layer 14 is let be present on the first liquid layer 12. By letting the second liquid layer 14 be gelled, a wet gel will be formed. After removing the inner frame 36, the net 34 is raised to take out the wet gel from the container 30.

Figure 6:
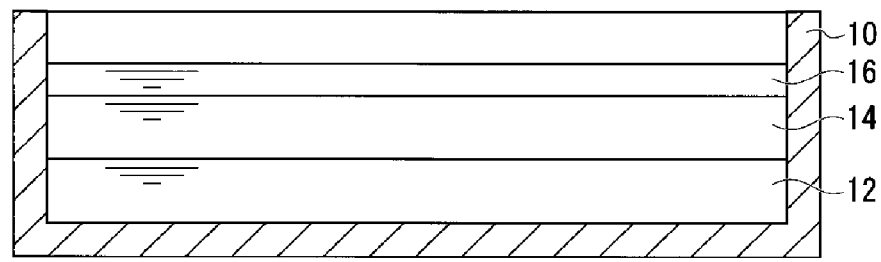
FIG. 6 is a schematic illustrative diagram showing still another embodiment of the method for producing a gel of the present invention.

FIG. 6 is a schematic illustrative diagram showing another embodiment of the method for producing a gel of the present invention.

The embodiment shown in FIG. 6 is an embodiment wherein a third liquid layer 16 is further let be present on the second liquid layer 14.

The third liquid layer 16 suppresses evaporation of the solvent from the second liquid layer 14 or the wet gel, and thereby suppresses cracking or breaking at the surface of the wet gel.

The third liquid layer 16 is preferably made of a third liquid having a specific gravity further smaller than the second liquid constituting the second liquid layer 14. The specific gravity of the third liquid layer is smaller by preferably at least 0.1, more preferably at least 0.3, further preferably at least 0.5, than the specific gravity of the second liquid. Further, the difference in specific gravity between the two liquids should better be larger, but if the specific gravity of the second liquid is excessively larger than the specific gravity of the third liquid, the type of such combination of liquids will be limited, and also, such means to increase the weight of the entire production apparatus, and therefore, the specific gravity of the former is preferably not larger by at least 3.0 than the latter.

The third liquid may be a hydrocarbon (hexane, heptane, octane, decane, dodecane, etc.), a hydrocarbon oil, a vegetable oil, a fatty acid, etc.

Although the production methods as illustrated above are batch systems, but a wet gel may be produced continuously. In the case of continuously producing a wet gel, the production may be carried out, for example, as follows.

While pouring the second liquid continuously on the first liquid layer, the second liquid layer formed on the first liquid layer is continuously moved on the first liquid layer so as to be away from the position where the second liquid is poured. By continuously letting the second liquid layer be gelled while continuously moving the second liquid layer on the first liquid layer, the formed wet gel is continuously withdrawn from the first liquid layer.

<Production of Laminated Glass>

Figure 7:
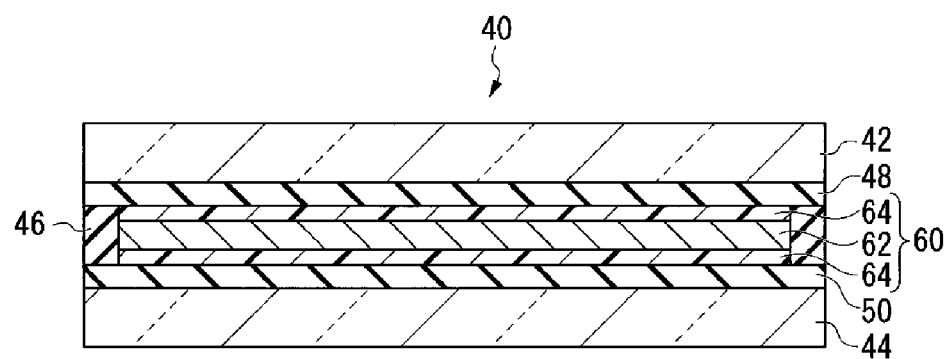
FIG. 7 is a cross-sectional view showing an example of a laminated glass having a transparent heat-insulating layer.

With respect to a xerogel obtained by the method for producing a gel of the present invention, by using it as a transparent heat insulating layer, it is possible to produce a laminated glass. FIG. 7 is a cross-sectional view showing an example of the laminated glass having a transparent heat insulating layer thus produced.

The laminated glass 40 comprises a first glass plate 42, a second glass plate 44, a transparent heat insulating sheet 60 disposed between the first glass plate 42 and the second glass plate 44, a spacer 46 disposed in a frame shape so as to surround the transparent heat insulating sheet 60 in contact with the periphery of the transparent heat insulating sheet 60, a first adhesive layer 48 to bond the first glass plate 42 and the transparent heat insulating sheet 60 and the spacer 46, and a second adhesive layer 50 to bond the second glass plate 44 and the transparent heat insulating sheet 60 and the spacer 46.

The transparent heat insulating sheet 60 comprises a transparent heat insulating layer 62, and two resin films 64 provided on the surfaces of the transparent heat insulating layer 62.

The material for the spacer 46 may be an adhesive transparent resin such as polyvinyl butyral or an ethylene-vinyl acetate copolymer, or the like.

As the first adhesive layer 48 and the second adhesive layer 50, an interlayer film for laminated glass, containing an adhesive transparent resin such as polyvinyl butyral or an ethylene-vinyl acetate copolymer, may be mentioned. The transparent heat insulating layer 62 is a xerogel obtained by the method for producing a gel of the present invention.

The material for the resin film 64 may be polyethylene terephthalate or the like.

EXAMPLES

In the following, the present invention will be described in detail with reference to Examples, but the present invention is not limited thereto. Here, Ex. 1 to 17 and 24 to 26 are Examples of the present invention, and Ex. 18 to 23 are Comparative Examples.

(Specific Gravity)

The magnitudes of the specific gravity of the first liquid and the specific gravity of the second liquid were expressed by the following standards.

A: The specific gravity of the first liquid is larger than the specific gravity of the second liquid.

B: The specific gravity of the first liquid and the specific gravity of the second liquid are substantially equal.

C: The specific gravity of the first liquid is smaller than the specific gravity of the second liquid.

(Incompatibility)

The second liquid was added little by little to 100 g of the first liquid, whereby the amount of the second liquid added until the second liquid was no longer dissolved, was adopted as the amount of the second liquid to be dissolved in 100 g of the first liquid. The incompatibility is expressed by the following standards.

A: The amount of the second liquid to be dissolved in 100 g of the first liquid is at most 1 g.

B: The amount of the second liquid to be dissolved in 100 g of the first liquid is more than 1 g and at most 100 g.

C: The amount of the second liquid to be dissolved in 100 g of the first liquid is more than 100 g.

D: The solvent of the first liquid and the second liquid is the same.

(Gelation Rate)

The gelation rate of the second liquid was expressed by the following standards.

A: The gelation rate of the second liquid is extremely fast.

B: The gelation rate of the second liquid material is fast.

C: Although there is no practical problem, the gelation rate of the second liquid is not so fast.

(Breakage of Wet Gel)

The presence or absence of breakage of the wet gel in the container immediately after the second liquid layer was let be gelled, was confirmed. Further, the presence or absence of breakage of the wet gel immediately after being taken out from the container, was confirmed.

(Thickness of Wet Gel)

As shown in FIG. 3, in two diagonal lines on the surface of the wet gel, points (total of 5 points) that divide the respective diagonal lines into four equal parts, were determined, whereby the thicknesses of the wet gel at the respective points were measured by a digimatic indicator (manufactured by Mitutoyo Corporation, ID-H0530) and an average thickness was obtained. Further, from the above-mentioned formula I, the standard deviation was obtained.

(Transmittance of Xerogel)

The transmittance of a xerogel was measured in accordance with JIS R3106: 1998 (corresponding to International Standard ISO 9050: 1990) by using a spectrophotometer (manufactured by Shimadzu Corporation, SolidSpec-3700DUV).

(Refractive Index of Xerogel)

With respect to the refractive index of a xerogel, the refractive index to light having a wavelength of 594 nm at 25° C. was measured by using a refractive index measuring device (US Metricon Corp., Prism Coupler: 2010/M).

(Ex. 1)

8 g of methyltrimethoxysilane, 2 g of tetramethoxysilane, 20 g of a 5 mmol/L acetic acid aqueous solution, 6 g of urea and 2 g of hexadecyltrimethylammonium bromide were put into a polyethylene container (hereinafter referred to also as a plastic container) containing a magnet stirrer, and stirred at 25° C. at 1,500 rpm for 60 minutes, to let the alkoxysilanes be hydrolyzed to form a sol, thereby to obtain a second liquid (specific gravity: 1.05).

When the second liquid was added to a polypropylene container (box shape of 100 mm in length, 100 mm in width and 25 mm in height) containing 50 g of a fluorinated solvent having a kinematic viscosity of 2.8 cSt and a specific gravity of 1.88 (3M Company trade name: Fluorinert FC-43) as a first liquid, the liquids were separated into two layers of the first liquid layer and the second liquid layer. The above polypropylene container was placed in a stainless steel sealed vessel and heated in an oven of 60° C. for four days, to let the second liquid layer be gelled. The wet gel taken out from the container was a monolith transparent gel having no cracks. The results are shown in Table 1.

Figure 8:
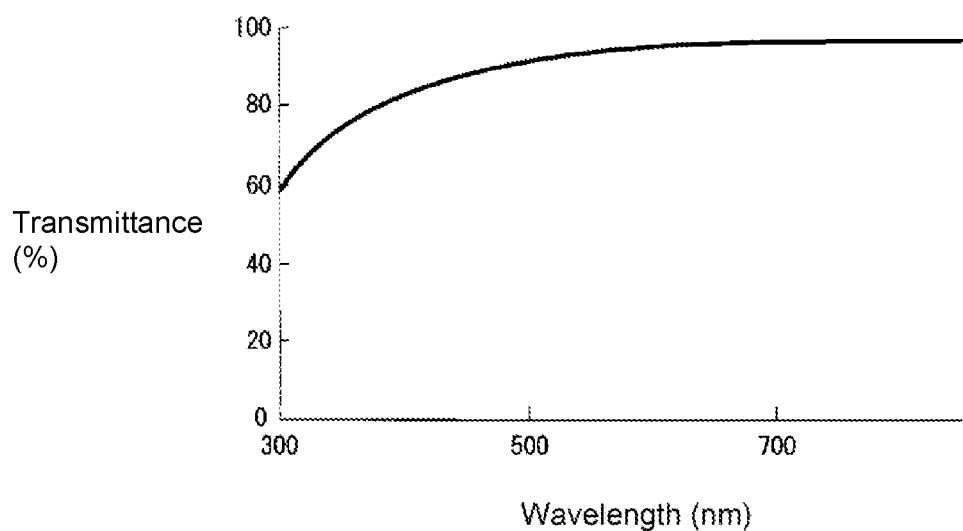
FIG. 8 is a transmittance spectrum of the polysiloxane xerogel in Ex. 1.
Figure 9:
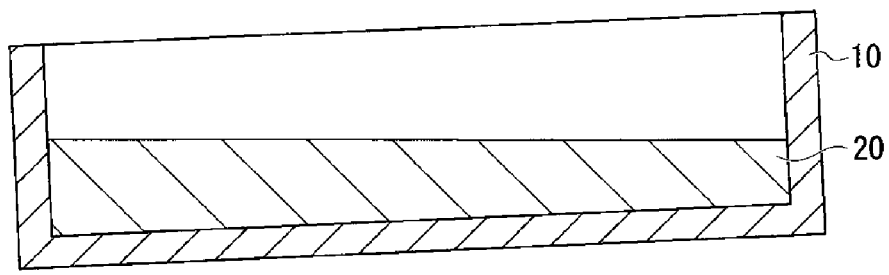
FIG. 9 is an illustrative diagram showing, in a schematic cross-sectional view of a mold, a state of producing a wet gel in the mold by an example of a conventional method for producing a wet gel.

The wet gel was solvent-substituted in the order of methanol, isopropanol and heptane. The heptane gel was put in an oven of 50° C. and dried for 24 hours under atmospheric pressure, to obtain a transparent polysiloxane xerogel. The transmittance was measured with respect to the polysiloxane xerogel. The results are shown in FIG. 8. The transmittance at a wavelength of 500 nm was 91%. Further, the refractive index at a wavelength of 594 nm was 1.045.

Ex. 2

10 g of methyltrimethoxysilane, 20 g of a 5 mmol/L acetic acid aqueous solution, 6 g of urea and 2 g of hexadecyltrimethylammonium chloride were put into the plastic container containing a magnet stirrer, and stirred at 25° C. at a rotational speed of 1500 rpm for 30 min, to let the alkoxysilane be hydrolyzed to form a sol, thereby to obtain a second liquid (specific gravity: 1.05).

When the second liquid was added to a polypropylene container (box shape of the same size as in Ex. 1) containing 50 g of a fluorinated solvent (3M Company trade name: Novec 7300) having a kinematic viscosity of 0.7 cSt and a specific gravity of 1.66, as a first liquid, the liquids were separated into two layers of the first liquid layer and the second liquid layer. The above polypropylene container was placed in a stainless steel sealed vessel and heated in an oven of 60° C. for four days, to let the second liquid layer be gelled. The wet gel taken out from the container was a monolith transparent gel having no cracks. The results are shown in Table 1.

Ex. 3

20 g of methyltrimethoxysilane, 40 g of a 5 mmol/L acetic acid aqueous solution, 12 g of urea and 4 g of hexadecyltrimethylammonium bromide were put into the plastic container containing a magnet stirrer, and stirred at 25° C. at a rotational speed of 1,500 rpm for 60 min to let the alkoxysilane be hydrolyzed to form a sol, thereby to obtain a second liquid (specific gravity: 1.05).

When the second liquid was added to a polypropylene container (box shape of the same size as in Ex. 1) containing 50 g of a fluorinated oil (Solvay trade name: Fomblin M15) having a kinematic viscosity of 150 cSt and a specific gravity of 1.83, as a first liquid, the liquids were separated into two layers of the first liquid layer and the second liquid layer. The above polypropylene container was placed in a stainless steel sealed vessel and heated in an oven of 60° C. for 3 days, to let the second liquid layer be gelled. The wet gel taken out from the container was a monolith transparent gel having no cracks. The results are shown in Table 1.

Ex. 4

30 g of methyltrimethoxysilane, 60 g of a 5 mmol/L acetic acid aqueous solution, 18 g of urea and 6 g of hexadecyltrimethylammonium bromide were put into the plastic container containing a magnet stirrer, and stirred at 25° C. at a rotational speed of 1,500 rpm for 60 min to let the alkoxysilane be hydrolyzed to form a sol, thereby to obtain a second liquid (specific gravity: 1.05).

When the second liquid was added to a polypropylene container (box shape of the same size as in Ex. 1) containing 50 g of chloroform having a specific gravity of 1.48, as a first liquid, the liquids were separated into two layers of the first liquid layer and the second liquid layer. The container was placed in a stainless steel sealed vessel and heated in an oven of 60° C. for four days, to let the second liquid layer be gelled. The wet gel taken out from the container was a monolith white gel having no cracks. The results are shown in Table 1.

Ex. 5

10 g of tetramethoxysilane, 20 g of a 5 mmol/L acetic acid aqueous solution and 6 g of urea were put into the plastic container containing a magnet stirrer, and stirred at 25° C. at a rotational speed of 1,500 rpm for 30 minutes, to let the alkoxysilane be hydrolyzed to form a sol thereby to obtain a second liquid (specific gravity: 1.05).

When the second liquid was added to a polypropylene container (box shape of the same size as in Ex. 1) containing 50 g of Fluorinert (3M Company trade name) FC-43 as a first liquid, the liquids were separated into two layers of the first liquid layer and the second liquid layer. The above polypropylene container was placed in a stainless steel sealed vessel, and heated in an oven of 60° C. for 3 days, to let the second liquid layer be gelled. The wet gel taken out from the container was a monolith transparent gel having no cracks. The results are shown in Table 1.

Ex. 6

15 g of methyltrimethoxysilane and 30 g of ethanol were put into the plastic container containing a magnet stirrer, and stirred at 25° C. for 1 min. 3 g of a 0.75 mol/L tetramethylammonium hydroxide aqueous solution was added thereto, and stirred at a rotational speed of 1,500 rpm for 10 seconds, to obtain a second liquid (specific gravity: 0.89).

When the second liquid was added to a polypropylene container (box shape of the same size as in Ex. 1) containing 50 g of Fluorinert (3M Company trade name) FC-43 as a first liquid, the liquids were separated into two layers of the first liquid layer and the second liquid layer. The above polypropylene container was placed in a stainless steel sealed vessel, and heated in an oven of 60° C. for 3 days, to let the second liquid layer be gelled. The wet gel taken out from the container was a monolith transparent gel having no cracks. The results are shown in Table 1.

Ex. 7

A wet gel was produced in the same manner as in Ex. 6 except that instead of the fluorinated solvent, 50 g of a silicone oil (manufactured by Shin-Etsu Chemical Co., Ltd., trade name KF-96-50cs) having a kinematic viscosity of 50 cSt and a specific gravity of 0.96 was used. The wet gel taken out from the container was a monolith translucent gel having no cracks. The results are shown in Table 2.

Ex. 8

5 g of tris[3-(trimethoxysilyl) propyl] isocyanurate and 40 g of N,N-dimethylformamide were put into the plastic container containing a magnet stirrer, and stirred at 25° C. for 1 min. 1 g of a 0.75 mol/L tetramethylammonium hydroxide aqueous solution was added thereto, and stirred at a rotational speed of 1,500 rpm for 5 seconds, to obtain a second liquid (specific gravity: 1.02).

When the second liquid was added to a polypropylene container (box shape of the same size as in Ex. 1) containing 50 g of Fluorinert (3M Company trade name) FC-43, as the first liquid, the liquids were separated into two layers of the first liquid layer and the second liquid layer. The above polypropylene container was placed in a stainless steel sealed vessel, and heated in an oven of 60° C. for 3 days, to let the second liquid layer be gelled. The wet gel taken out from the container was a monolith transparent gel having no cracks. The results are shown in Table 2.

Ex. 9

A silyl group-containing polymer was obtained by introducing a hydrolyzable silyl group to the terminal of a trifunctional polyether polyol having an average molecular weight of 5,000 obtained by adding 80 mass % of propylene oxide and 20 mass % of ethylene oxide to glycerin, in the same manner as in the method described in JP-A-H6-340798.

30 g of the silyl group-containing polymer and 90 g of methanol were put into the plastic container containing a magnet stirrer, and stirred at 25° C. for 10 minutes. 6 g of a 0.75 mol/L tetramethylammonium hydroxide aqueous solution was added thereto, and stirred at a rotational speed of 1,500 rpm for 5 seconds, to obtain a second liquid (specific gravity: 0.89).

When the second liquid was added to a polypropylene container (box shape of the same size as in Ex. 1) containing 50 g of Fluorinert (3M Company trade name) FC-43, as the first liquid, the liquids were separated into two layers of the first liquid layer and the second liquid layer. The above polypropylene container was placed in a stainless steel sealed vessel, and heated in an oven of 60° C. for 3 days, to let the second liquid layer be gelled. The wet gel taken out from the container was a monolith transparent gel having no cracks. The results are shown in Table 2.

Ex. 10

By the same method as the method described in Japanese Patent No. 4,998,981, undried sulfite bleached softwood pulp (in an amount of 2 g by dry weight), 0.025 g of 2,2,6,6-tetramethylpiperidine-1-oxyl (TEMPO) and 0.25 g of sodium bromide, were dispersed in 150 mL of water, and then, a 13 mass % sodium hypochlorite aqueous solution was added so that the amount of sodium hypochlorite would be 2.5 mmol to 1 g of the pulp, to initiate the reaction. During the reaction, the pH was maintained to be 10 by dropwise adding a 0.5 mol/L sodium hydroxide aqueous solution. The time point when the change in pH was no longer observed, was regarded as completion of the reaction, and the reaction product was filtered through a glass filter, followed by repeating 10 times of washing by a sufficient amount of water and filtration, to obtain an oxidized pulp having water impregnated so that the solid content would be 25 mass %.

To the obtained oxidized pulp, water was added to form a 2 mass % slurry, which was then treated for 10 minutes by a rotating blade homogenizer. Since the viscosity of the slurry was remarkably increased along with the treatment, water was added little by little, and the dispersion treatment by the mixer was continued until the solid content concentration became 0.5 mass %. After treatment for 5 minutes by an ultrasonic homogenizer, coarse material such as non-fibrillated pulp was removed, to obtain a TEMPO oxidized cellulose nanofiber dispersion. This was used as the second liquid (specific gravity: 1.01).

When the second liquid was added to a polypropylene container (box shape of the same size as in Ex. 1) containing 50 g of a fluorinated solvent (Asahi Glass Co., Ltd. trade name, AK-225, specific gravity 1.55) as a first liquid, the liquids were separated into two layers of the first liquid layer and the second liquid layer. The above polypropylene container was placed in a larger polypropylene sealed container, and a sample bottle containing hydrochloric acid was disposed in a space between the two containers, and left to stand for 2 days, whereby the second liquid layer containing the cellulose nanofibers was gelled by the vapor of hydrochloric acid. The wet gel taken out from the container was a monolith transparent gel having no cracks. The results are shown in Table 2.

Ex. 11

A wet gel was produced in the same manner as in Ex. 10 except that chloroform was used instead of the fluorinated solvent. The wet gel taken out from the container was a monolith translucent gel having no cracks. The results are shown in Table 2.

Ex. 12

On a magnetic stirrer provided with a hot plate, a glass sample bottle containing a magnetic stirrer and charged with 4 g of water and 36 g of ethanol, was placed, and with stirring at a rotational speed of 1,500 rpm, 10 g of a polymethyl methacrylate powder (manufactured by Mitsubishi Chemical Corp., BR80, mass average molecular weight: 95,000) was added. By heating the heater to 100° C. in order to dissolve the polymethyl methacrylate, a uniform solution was obtained after 2 hours. This was used as the second liquid (specific gravity: 0.95).

When the second liquid was added to a polypropylene container (box shape of the same size as in Ex. 1) containing 50 g of Fluorinert (3M Company trade name) FC-43, as a first liquid, the liquids were separated into two layers of the first liquid layer and the second liquid layer. The above polypropylene container was placed in a stainless steel sealed vessel, and left to stand for 24 hours in a refrigerator of 5° C., to let the second liquid layer be gelled. The wet gel taken out from the container was a monolith white gel having no cracks. The results are shown in Table 2.

Ex. 13

1 g of urethane acrylate (manufactured by Shin-Nakamura Chemical Co., Ltd., UA-160™), 1 g of dipentaerythritol hexaacrylate (manufactured by Shin-Nakamura Chemical Co., Ltd., A-DPH), 0.5 g 1,6-hexanediol diacrylate (manufactured by Shin-Nakamura Chemical Co., Ltd., A-HDN) and 0.1 g of 1-hydroxycyclohexyl phenyl ketone (BASF trade name: Irgacure 184) were dissolved in 22.5 g of cyclopentanone, to obtain a second liquid (specific gravity: 0.98).

When the second liquid was added to a polypropylene container (box shape of the same size as in Ex. 1) containing 50 g of Fluorinert (3M Company trade name) FC-43, as the first liquid, the liquids were separated into two layers of the first liquid layer and the second liquid layer. From a high pressure mercury lamp, ultraviolet rays were irradiated at an intensity of 150 mW/cm$^2$ for 5 minutes, i.e. an integrated light quantity of 45 J/cm$^2$, from the top thereof, to let the second liquid layer be gelled. The wet gel taken out from the container was a monolith transparent gel having no cracks. The results are shown in Table 3.

Ex. 14

A gel was produced in the same manner as in Ex. 13 except that distilled water was used instead of the fluorinated solvent. The wet gel taken out from the container was a monolith transparent gel having no cracks. The results are shown in Table 3.

Ex. 15

10 g of methyltrimethoxysilane, 20 g of a 5 mmol/L acetic acid aqueous solution, 6 g of urea, 2 g of hexadecyltrimethylammonium bromide and 50 g of Novec (3M Company trade name) 7300 were put into the plastic container containing a magnetic stirrer, and stirred at 25° C. at a rotational speed of 1,500 rpm for 60 minutes. When the stirring was stopped, the mixture was separated into respectively transparent two layers of the first liquid layer and the second liquid layer. This was placed in a polypropylene container (box shape of the same size as in Ex. 1), and the above polypropylene container was placed in a stainless steel sealed vessel and heated in an oven of 60° C. for four days, to let the second liquid layer be gelled. The wet gel taken out from the container was a monolith transparent gel having no cracks. The results are shown in Table 3.

Ex. 16

A second liquid was obtained in the same manner as in Ex. 2. Into a polypropylene container (box shape of the same size as in Ex. 1), 50 g of Novec (3M Company trade name) 7300 was put as a first liquid, and thereon, the second liquid was added, and further thereon, 30 g of n-heptane having a specific gravity of 0.68 was added as a third liquid, whereby the liquids were separated into three layers of the first liquid layer, the second liquid layer and the third liquid layer. The above polypropylene container was placed in a stainless steel sealed vessel and heated in an oven of 60° C. for four days, to let the second liquid be gelled. The wet gel was present in such a state as floating between the first liquid layer and the third liquid layer. The wet gel taken out from the container was a monolith transparent gel having no cracks. The results are shown in Table 3.

Ex. 17

A second liquid was obtained in the same manner as in Ex. 8. When the second liquid was added to a polypropylene container (box shape of the same size as in Ex. 1) containing 50 g of distilled water as a first liquid, the liquids were separated into two layers of the first liquid layer and the second liquid layer. After 5 minutes, the second liquid layer lost flowability, and left to stand still at 25° C. for 1 hour to let the second liquid be gelled. The wet gel taken out from the container was a monolith transparent gel having no cracks. The results are shown in Table 3.

Ex. 18

A wet gel was obtained in the same manner as in Ex. 1 except that without using the first liquid, the second liquid was added to a polypropylene container (box shape of the same size as in Ex. 1). The wet gel was transparent, but had been broken into several fragments already before taking it out from the container. The results are shown in Table 4.

Ex. 19

A wet gel was obtained in the same manner as in Ex. 18, except that as a releasing agent, silicone oil (Shin-Etsu Chemical Co., Ltd., KF-96-50cs) was preliminarily applied to the polypropylene container (box shape of the same size as in Ex. 1). It was not broken before taking it out from the container, but at the time of taking out the wet gel from the container, the wet gel was hardly peeled from the bottom surface of the container, and the wet gel was broken into several fragments. The results are shown in Table 4.

Ex. 20

A wet gel was obtained in the same manner as in Ex. 19. At the time of taking out the wet gel from the container, it was immersed in water together with the container, and the wet gel was peeled from the bottom surface of the container, whereby it was possible to take out the wet gel without being broken. The wet gel taken out from the container was a monolithic transparent gel having no cracks, but a bias was apparently observed in the thickness. The results are shown in Table 4.

Ex. 21

A second liquid was obtained in the same manner as in Ex. 2. When the second liquid was added to a polypropylene container (box shape of the same size as in Ex. 1) containing 50 g of ethylene glycol having a specific gravity of 1.11, as a first liquid, so as not to disturb the liquid surface of the first liquid as far as possible, the liquids were separated into two layers of the first liquid layer and the second liquid layer. The above polypropylene container was placed in a stainless steel sealed vessel and heated in an oven of 60° C. for 3 days. In the course of the heating, the first liquid layer and the second liquid layer were mixed with each other, and the liquid in the container had all been gelled. The wet gel, although had a little haze, was almost transparent. When it was tried to peel the wet gel from the bottom of the container in order to take it out from the container, the wet gel was broken. The results are shown in Table 4.

Ex. 22

A second liquid was obtained in the same manner as in Ex. 2. The second liquid was added to a polypropylene container (box shape of the same size as in Ex. 1) containing 50 g of distilled water as a first liquid, so as not to disturb the liquid surface of the first liquid as far as possible, but the first liquid and the second liquid were mixed and not separated into two layers. The above polypropylene container was placed in a stainless steel sealed vessel and heated in an oven of 60° C. for four days. The liquid in the container had all been gelled. The wet gel was transparent. When it was attempted to peel the wet gel from the bottom surface of the container in order to take it out from the container, the wet gel was broken. The results are shown in Table 4.

Ex. 23

A second liquid was obtained in the same manner as in Ex. 2. The second liquid was added to a polypropylene container (box shape of the same size as in Ex. 1) containing 50 g of n-heptane having a specific gravity of 0.68, as a first liquid, so as not to disturb the liquid surface of the first liquid as far as possible, the second liquid sunk below the first liquid immediately without floating on top, to form a two layer structure wherein the bottom layer was the second liquid and the upper layer was the first liquid. The above polypropylene container was placed in a stainless steel sealed vessel and heated in an oven of 60° C. for four days. In the container, the upper layer was n-heptane, and the lower layer was a wet gel. The wet gel was a monolith transparent gel having no cracks. When it was attempted to peel the wet gel from the bottom surface of the container in order to take it out from the container, the wet gel was broken. The results are shown in Table 4.

Ex. 24

60 g of dimethoxy methyl vinyl silane (hereinafter abbreviated as VMDMS) and 0.66 g of di-tert-butyl peroxide were put into a stainless steel pressure-resistant vessel, and nitrogen replacement was carried out. This pressure-resistant vessel was maintained in an oven of 120° C. for 72 hours, and then taken out from the oven, to obtain a viscous transparent liquid.

10 g of this transparent liquid and 35.2 g of benzyl alcohol (hereinafter abbreviated as BzOH) were put into a glass container containing a magnetic stirrer, and stirred at 25° C. at a rotational speed of 800 rpm for 5 minutes, whereupon 2.8 g of a 1.2M aqueous solution of tetramethylammonium hydroxide was added and further stirred for 3 minutes to obtain a second liquid (specific gravity: 1.07).

When the second liquid was added to a polypropylene container (box shape of the same size as in Ex. 1) containing 50 g of Fluorinert (3M Company trade name) FC-43 as a first liquid, the liquids were separated into two layers of the first liquid layer and the second liquid layer. The above polypropylene container was placed in a stainless steel sealed vessel, and heated in an oven of 80° C. for 24 hours, to let the second liquid layer be gelled. The wet gel taken out from the container was a monolith transparent gel having no cracks. The results are shown in Table 5.

Further, the wet gel was solvent-substituted at 60° C. three times with each of isopropanol and heptane sequentially in this order. The heptane gel was taken out from heptane, placed in an oven of 60° C. and dried for 24 hours under normal pressure, to obtain a transparent polysiloxane xerogel. This xerogel had a density of 0.22 g/cm$^3$, and thus was found to be a porous body.

Ex. 25

30 g of 3-methacryloxypropyl trimethoxysilane (manufactured by Shin-Etsu Chemical Co., Ltd., KBM-503), 30 g of ethanol and 0.33 g of 2,2'-azobis(2,4-dimethylvaleronitrile (manufactured by Wako Pure Chemical Industries, Ltd.; V65) were put into a stainless steel pressure-resistant vessel, and nitrogen substitution was carried out. This pressure-resistant vessel was held in an oven of 60° C. for 48 hours, and then taken out from the oven, to obtain a viscous transparent liquid.

10 g of this transparent liquid and 40 g of BzOH were put into a glass container containing a magnetic stirrer, and stirred at 25° C. at a rotational speed of 800 rpm for 5 minutes, whereupon 1 g of a 0.6M aqueous solution of tetramethylammonium hydroxide was added, and further stirred for 10 seconds to obtain a second liquid.

When the second liquid was added to a polypropylene container (box shape of the same size as in Ex. 1) containing Fluorinert (3M Company trade name) FC-43 as a first liquid, the liquids were separated into two layers of the first liquid layer and the second liquid layer. The above polypropylene container was placed in a stainless steel sealed vessel, and heated in an oven of 80° C. for 24 hours, to let the second liquid layer be gelled. The wet gel taken out from the container was a monolith transparent gel having no cracks. The results are shown in Table 5.

Further, the wet gel was solvent-substituted at 60° C. three times with each of isopropanol and heptane sequentially in this order. The heptane gel was taken out from heptane, put in an oven of 60° C. and dried for 24 hours under normal pressure, to obtain a transparent polysiloxane xerogel. This xerogel had a density of 0.71 g/cm$^3$ and thus was found to be a porous body.

Ex. 26

30 g of 3-methacryloxypropyl methyldimethoxysilane (manufactured by Shin-Etsu Chemical Co., Ltd., KBM-502), 30 g of ethanol and 0.33 g of 2,2'-azobis (2,4-dimethylvaleronitrile were put into a stainless steel pressure-resistant vessel, and nitrogen substitution was carried out. This pressure-resistant vessel was held in an oven of 60° C. for 48 hours and then taken out from the oven, to obtain a viscous transparent liquid.

10 g of this transparent liquid and 40 g of BzOH were put into a glass container containing a magnetic stirrer, and stirred at 25° C. at a rotational speed of 800 rpm for 5 minutes, whereupon 1.2 g of a 0.6M aqueous solution of tetramethylammonium hydroxide was added and further stirred for 10 seconds, to obtain a second liquid (specific gravity: 1.07).

When the second liquid was added to a polypropylene container (box shape of the same size as in Ex. 1) containing 50 g of Fluorinert (3M Company trade name) FC-43 as a first liquid, the liquids were separated into two layers of the first liquid layer and the second liquid layer. The above polypropylene container was placed in a stainless steel sealed vessel, and heated in an oven of 80° C. for 24 hours, to let the second liquid layer be gelled. The wet gel taken out from the container was a monolith transparent gel having no cracks. The results are shown in Table 5.

Further, the wet gel was solvent-substituted at 60° C. three times with each of isopropanol and heptane sequentially in this order. The heptane gel was taken out from heptane, placed in an oven of 60° C. and dried for 24 hours under normal pressure, to obtain a transparent polysiloxane xerogel. This xerogel had a density of 0.72 g/cm$^3$ and thus was found to be a porous body.

TABLE 1

| | | Ex. 1 | Ex. 2 | Ex. 3 | Ex. 4 | Ex. 5 | Ex. 6 |
|---|---|---|---|---|---|---|---|
| First liquid | | Fluorinert FC-43 | Novec 7300 | Fomblin M15 | Chloroform | Fluorinert FC-43 | Fluorinert FC-43 |
| Second liquid | Gel raw material | MTMS/TMOS | MTMS | MTMS | MTMS | TMOS | MTMS |
| | Solvent | Water | Water | Water | Water | Water | EtOH |
| Specific gravity | | A | A | A | A | A | A |
| Incompatibility | | A | A | A | B | A | A |
| Gelation rate | | C | C | C | C | C | B |
| Breakage of wet gel | In container | Nil | Nil | Nil | Nil | Nil | Nil |
| | After taken out | Nil | Nil | Nil | Nil | Nil | Nil |
| Average thickness (mm) | | 3.02 | 3.10 | 7.16 | 11.10 | 3.02 | 5.30 |
| Standard deviation (mm) | | 0.04 | 0.07 | 0.11 | 0.35 | 0.08 | 0.07 |

TABLE 2

|  |  | Ex. 7 | Ex. 8 | Ex. 9 | Ex. 10 | Ex. 11 | Ex. 12 |
|---|---|---|---|---|---|---|---|
| First liquid |  | Silicone oil KF-96 | Fluorinert FC-43 | Fluorinert FC-43 | AK-225 | Chloroform | Fluorinert FC-43 |
| Second liquid | Gel raw material | MTMS | TTPI | Silyl group-containing polymer | Cellulose | Cellulose | PMMA |
|  | Solvent | EtOH | DMF | MeOH | Water | Water | Water/EtOH |
| Specific gravity |  | A | A | A | A | A | A |
| Incompatibility |  | B | A | A | A | B | A |
| Gelation rate |  | B | A | C | C | C | B |
| Breakage of wet gel | In container | Nil | Nil | Nil | Nil | Nil | Nil |
|  | After taken out | Nil | Nil | Nil | Nil | Nil | Nil |
| Average thickness (mm) |  | 5.50 | 4.33 | 14.50 | 4.35 | 4.55 | 4.50 |
| Standard deviation (mm) |  | 0.21 | 0.07 | 0.49 | 0.14 | 0.28 | 0.21 |

TABLE 3

|  |  | Ex. 13 | Ex. 14 | Ex. 15 | Ex. 16 | Ex. 17 |
|---|---|---|---|---|---|---|
| First liquid |  | Fluorinert FC-43 | Water | Novec 7300 | Novec 7300 | Water |
| Second liquid | Gel raw material | Acrylate | Acrylate | MTMS | MTMS | TTPI |
|  | Solvent | Cyclopentanone | Cyclopentanone | Water | Water | DMF |
| Specific gravity |  | A | A | A | A | A |
| Incompatibility |  | A | A | A | A | C |
| Gelation rate |  | B | B | C | C | A |
| Breakage of wet gel | In container | Nil | Nil | Nil | Nil | Nil |
|  | After taken out | Nil | Nil | Nil | Nil | Nil |
| Average thickness (mm) |  | 2.10 | 2.24 | 3.54 | 3.30 | 4.09 |
| Standard deviation (mm) |  | 0.07 | 0.10 | 0.10 | 0.07 | 0.10 |

TABLE 4

|  |  | Ex. 18 | Ex. 19 | Ex. 20 | Ex. 21 | Ex. 22 | Ex. 23 |
|---|---|---|---|---|---|---|---|
| First liquid |  | Nil | Nil | Nil | EG | Water | n-heptane |
| Second liquid | Gel raw material | MTMS/TMOS | MTMS/TMOS | MTMS/TMOS | MTMS | MTMS | MTMS |
|  | Solvent | Water | Water | Water | Water | Water | Water |
| Specific gravity |  | — | — | — | A | B | C |
| Incompatibility |  | — | — | — | C | D | A |
| Gelation rate |  | C | C | C | C | C | C |
| Breakage of wet gel | In container | Present | Nil | Nil | Nil | Nil | Nil |
|  | After taken out | Present | Present | Nil | Present | Present | Present |
| Average thickness (mm) |  | — | — | 2.95 | — | — | — |
| Standard deviation (mm) |  | — | — | 0.71 | — | — | — |

TABLE 5

|  |  | Ex. 24 | Ex. 25 | Ex. 26 |
|---|---|---|---|---|
| First liquid |  | Fluorinert FC-43 | Fluorinert FC-43 | Fluorinert FC-43 |
| Second liquid | Gel raw material | VMDMS | KBM-503 | KBM-502 |
|  | Solvent | BzOH | BzOH | BzOH |
| Specific gravity |  | A | A | A |
| Incompatibility |  | A | A | A |
| Gelation rate |  | B | A | A |
| Breakage of wet gel | In container | Nil | Nil | Nil |
|  | After taken out | Nil | Nil | Nil |
| Average thickness (mm) |  | 4.24 | 4.18 | 4.10 |
| Standard deviation (mm) |  | 0.31 | 0.18 | 0.29 |

Here, the meanings of the abbreviations in the above Tables are as follows.

MTMS: methyltrimethoxysilane, TMOS: tetramethoxysilane,
TTPI: tris[3-(trimethoxysilyl) propyl] isocyanurate,
Cellulose: TEMPO oxidized cellulose nanofibers,
PMMA: polymethyl methacrylate, EtOH: ethanol,
DMF: N,N-dimethylformamide, MeOH: methanol,
EG: ethylene glycol, VMDMS: dimethoxymethyl vinyl silane
BzOH: benzyl alcohol.

INDUSTRIAL APPLICABILITY

The method for producing a gel of the present invention is useful as a method for producing a xerogel to be used as a transparent heat insulating material or the like.

This application is a continuation of PCT Application No. PCT/JP2018/031242, filed on Aug. 23, 2018, which is based upon and claims the benefit of priority from Japanese Patent Application No. 2017-168932 filed on Sep. 1, 2017. The contents of those applications are incorporated herein by reference in their entireties.

REFERENCE SYMBOLS

10: mold, 12: first liquid layer, 14: second liquid layer, 16: third liquid layer, 20: wet gel, 30: container, 32: rod, 34: net, 36: inner frame, 40: laminated glass 42: first glass plate, 44: second glass plate, 44: spacer, 48: first adhesive layer, 50: second adhesive layer, 60: transparent insulation sheet, 62: transparent insulation layer, 64: resin film.

What is claimed is:

1. A method for producing a wet gel, which comprises, in such a state that a second liquid layer made of a second liquid containing a gel raw material, is present on a first liquid layer made of a first liquid, letting the second liquid layer be gelled,
wherein the specific gravity of the first liquid is larger than the specific gravity of the second liquid.

2. The method for producing a wet gel according to claim 1, wherein the second liquid layer is let be gelled while maintaining the separation state between the first liquid layer and the second liquid layer.

3. The method for producing a wet gel according to claim 1, wherein the amount of the second liquid which is dissolved in 100 g of the first liquid is at most 100 g.

4. The method for producing a wet gel according to claim 1, wherein as the first liquid and the second liquid, ones which do not react with each other are used.

5. The method for producing a wet gel according to claim 1, wherein the first liquid does not substantially contain a gel raw material.

6. The method for producing a wet gel according to claim 1, wherein the standard deviation in the thickness of the wet gel obtained by letting the second liquid layer be gelled, is at most 0.5 mm.

7. The method for producing a wet gel according to claim 1, wherein the first liquid is a liquid compound having a fluorine atom, a liquid compound having a chlorine atom, a liquid compound having a silicon atom, water, or mercury.

8. The method for producing a wet gel according to claim 1, wherein the first liquid is a fluorinated solvent, a fluorinated oil, a chlorinated solvent, a chlorinated oil or a silicone-type oil.

9. The method for producing a wet gel according to claim 1, wherein a solvent contained in the second liquid is an organic solvent or water.

10. A method for producing a xerogel, which comprises drying the wet gel obtainable by the production method as defined in claim 1, or a solvent substituted gel obtainable by subjecting said wet gel to solvent substitution, to obtain a xerogel.

11. The method for producing a xerogel according to claim 10, wherein the xerogel is a polysiloxane, a polymethyl (meth)acrylate, a polystyrene, an addition condensate of resorcinol or melamine with formaldehyde, or cellulose.

12. The method for producing a xerogel according to claim 10, wherein the transmittance at a wavelength 500 nm of the xerogel is at least 70% as calculated in a thickness of 1 mm.

13. The method for producing a xerogel according to claim 10, wherein the refractive index of light having a wavelength of 594 nm at 25° C., of the xerogel, is from 1.0 to 1.1.

14. A method for producing a laminated glass, which comprises producing a xerogel by the production method as defined in claim 10, and then, sandwiching the obtained xerogel by glass plates.

* * * * *